March 25, 1958     S. R. PARIS     2,827,849
CAKE PAN

Filed May 28, 1954     2 Sheets-Sheet 1

INVENTOR.
Secondo R. Paris
BY
Attorney

March 25, 1958     S. R. PARIS     2,827,849
CAKE PAN

Filed May 28, 1954     2 Sheets-Sheet 2

INVENTOR.
Secondo R. Paris
BY
Attorney

2,827,849

CAKE PAN

Secondo R. Paris, Cleveland, Ohio

Application May 28, 1954, Serial No. 433,003

2 Claims. (Cl. 99—435)

This invention relates to baking and more particularly to a cake baking pan.

Broadly the invention comprehends the provision of a cake baking pan which is convertible for the baking of a variety of cakes of different size and shape.

Although a great number of cake baking pans of different size and shape have been devised, manufactured and used none of a distinct cake size and shape conversion type have previously been devised.

Among the principal objects of the invention is the provision of a cake baking pan, that;

a. Is convertible in a simple and quick manner to a variety of different shapes and sizes;

b. Permits of a quick and easy removal of a baked cake from the pan;

c. Includes a plate and a plurality of interconnectible panel or wall elements adapted to be supported in desired array and size on the plate for the receipt of the cake batter within the confines thereof, and d. Includes a plate and a plurality of panel elements for attachment to one another in continuous series arrangement to form the perimetral bounds of a cake to be baked and wherein said plate can be used as a server after the removal of the panel elements from the baked cake and plate.

Other objects and advantages will appear from the drawings, taken in connection with the description and wherein.

Similar reference numerals throughout the several views refer to like parts.

Figure 1:
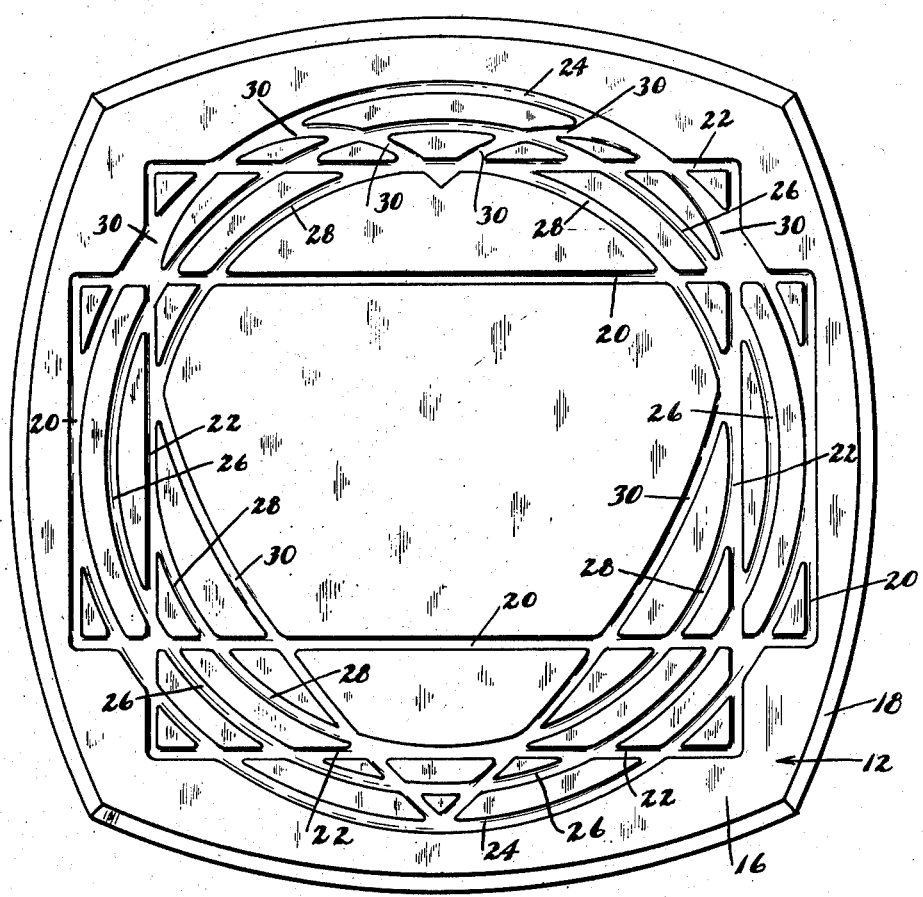
Fig. 1 is a top elevation view of a cake plate constituting a part of the invention.
Figure 2:
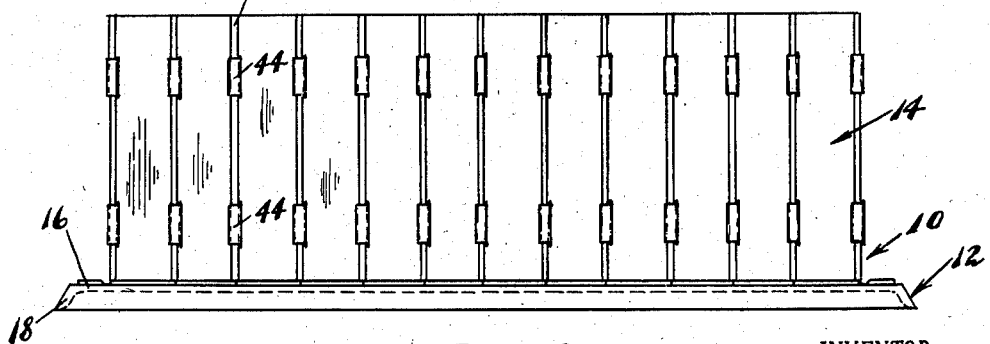
Fig. 2 is a side elevation view of a cake baking pan including the plate of Fig. 1 as a part thereof.
Figure 5:
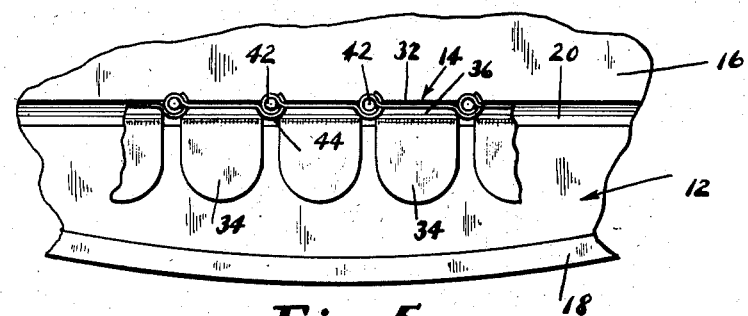
Fig. 5 is a fragmentary top elevation view of the pan of Fig. 2.
Figure 3:
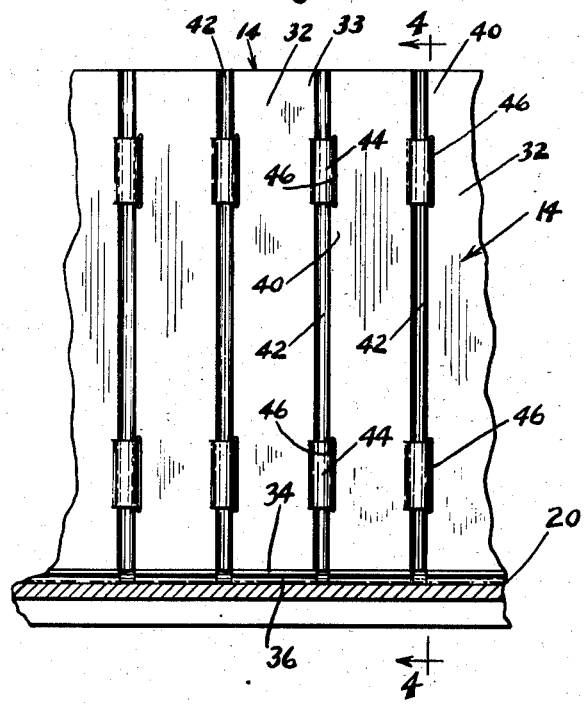
Fig. 3 is an enlarged partly cross-sectionalized fragmentary view of the cake pan shown by Fig. 2, clearly disclosing the attachable and detachable panel elements of the pan.

This invention was devised for the purpose of providing a cake baking pan which can readily be changed to various shapes and sizes, that is rectangular, square, circular of varying size and even heart shape all with solely the use of one plate and a plurality of like panel elements or members that are adapted to be assembled in desired shape and size on the plate. Through the provision of a plurality of predetermined shaped grooves arranged in overlapping relation on the upper surface of the plate and the provision of a predetermined number of the panel elements attachable and detachable from one another, depending on the size and shape of the cake to be baked, a cake pan assembly is had which occupies the space of say only one normal cake pan while in effect constituting a plural number of different cake pans. The party utilizing this cake pan assembly can as desired arrange a predetermined number of panel elements on the plate to a size and shape comforming to the particular groove shape and size chosen. A stand or base portion of each panel element is adapted to be received in the selected groove and an adjoining portion of each panel element affords means for supporting the panel elements in vertical extension on the plate so as to define a enclosure of desired shape and size with a selected portion of the plate forming the bottom of the enclosure. The batter for making the cake is adapted to be poured into said enclosure.

After the cake is baked, the panel elements are detached from one another to thus provide an easy manner of freeing the cake from baked engagement therewith. With the panel elements removed the cake can be frosted if desired in its position on the plate and can subsequently be served directly from the plate.

Referring to the drawing for more specific details of the invention 10 refers generally to a cake baking pan comprising basically a plate or base 12 and a plurality of panel or wall elements 14.

Plate 12 includes integral shelf and perimetral rim portions 16 and 18 respectively with rim portion 16 serving as a stand for the plate. A plurality of interconnected grooves 20, 22, 24, 26, 28 and 30 are provided on the upper surface of shelf 16, with grooves 24, 26 and 28 being circular in form and arranged concentric to one another with circular groove 24 being largest in diameter and circular grooves 26 and 28 being consecutively smaller than one another. Groove 22 is square in form whereas groove 20 is rectangular in form.

A combination of a part of grooves 20 and 22 forms a smaller rectangle than that formed by groove 20 alone. The second rectangle so formed is of like width as the first rectangle but of lesser length. Groove 30 is in the form of a heart. It is to be noted that several of the different grooves have portions thereof coinciding with one another, thus providing a very compact structure capable of great utility in the baking of a plurality of different size and shape cakes.

Figure 4:
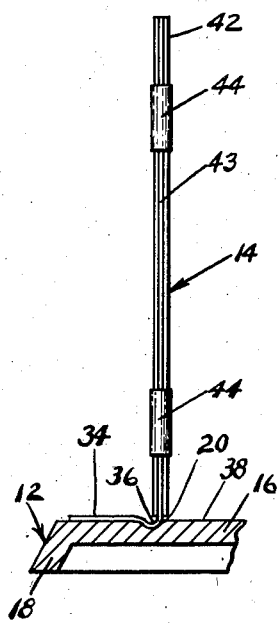
Fig. 4 is a view taken substantially along lines 4—4 of Fig. 3.
Figure 6:
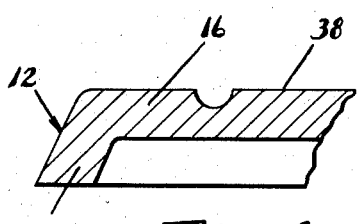
Fig. 6 is a fragmentary vertical partly cross-sectionalized view of a rim portion of the plate of Fig. 1.

Panel or wall elements 14 each comprises basically a flat upright or vertical portion 32 and an integral base or horizontal portion 34. Base portion 34 is curved 36 at its junction with upright portion 32, said curved section 36 being complementary to the curvature of the grooves for receipt therein as shown by Fig. 4, with the major part of base portion 34 lying horizontally in bearing relation upon the upper surface 38 of shelf 16. As such the panel or wall elements 14 are effectively supported as desired on the plate 12.

One vertical edge 40 of each element has a folded over rib or bead 42 and the opposite vertical edge 43 of each element has a pair of vertically spaced curved fingers 44. A pair of spaced slots 46 are provided adjacent bead 42 and conform in spacing to the fingers 44. Slots 46 are of a size width and lengthwise slightly greater than fingers 44 so as to permit of ease in the insertion of said fingers 44 into slots 46 for the attachment of the panel elements in series attached relation with one another. Fingers 44 in addition to their fit relation with slots 46 have an internal curvature of a size conforming with the external size of bead 42 and as such fingers 44 embrace bead 42 when said fingers are received in their appropriate slots.

In arranging panel elements 14 upon the shelf 16 of plate 12 with the bead and fingers thereof hinged together the upright portion of panel elements 14 are arranged perpendicular to shelf 16 with the base portions of the panel elements extending outwardly toward the rim of the plate.

By way of example in the use of the panel elements 14, a predetermined number thereof would be required to be mounted upon shelf 16 in series attached relation with the curved sections 36 of the base portions of the panel elements seated in groove 20, to provide for the baking of a loaf or rectangular cake.

Thus in the establishing of an enclosure for the baking of a particular cake be it loaves of varied sizes as defined by groove 20 or a combination of grooves 20 and 22, square as defined by groove 22, round as defined by grooves 24, 26 or 28, or heart as defined by groove 30, a predetermined number of panel elements 14 will be required.

With the panel elements so arranged for the baking of a cake of particular shape and size the shelf forms the bottom of the cake pan and the panel elements a continuous wall or enclosure into which the cake batter is adapted to be poured.

After the utilization of pan 10 in the baking of a cake it is then only necessary to detach the elements 14 from hinged or connected relation with one another thereby readily filling the baked cake from engagement therewith without fear of harming the cake in the slightest manner. With the elements so removed, the cake can be frosted on the plate and subsequently served directly therefrom if so desired.

Although the cake pan as devised is illustrated specifically as to the selection of cake shapes to be baked and as to the form of panel elements it is obvious that material departures therefrom could be made without altering the basic premise that is a base or plate having varied configuration grooves therein and a plurality of panel elements to be supported in desired conformity thereto. Accordingly the invention is to be interpreted in the light thereof as defined by the appended claims.

What I claim is:

1. A cake baking pan comprising a plate having a flat upper surface and a plurality of overlapping grooves extending downwardly from said flat surface providing a plurality of different overlapping shapes and a plurality of wall elements secured in hinged series relation with one another to form an enclosure and to conform to one of the shapes formed by the grooves, each having a curved portion received in its appropriate groove and a flat portion arranged substantially at right angles to the flat upper surface of the plate, and a third portion arranged substantially at right angles to the second portion and adjacent the curved portion adapted to bear upon the flat upper surface of the plate, extending outwardly toward the outer periphery of the plate, said plate including a perimetral stand portion and said wall elements being alike and having a plurality of spaced vertical slots adjacent one beaded vertical edge of the second portion of each element, and a plurality of spaced fingers on the opposite vertical edge thereof, wherein the fingers of one element are adapted to be received in the slots of the adjacent element in embracing relationship to the beaded edge thereof, whereby continuous arrangement of the elements hinged together to conform to a selected groove shape provide an enclosure with the plate as the bottom thereof, said wall elements being adaptable and arranged in enclosure form to conform to any desired shape formed by the grooves.

2. A cake baking pan according to claim 1, wherein the wall elements have a much greater vertical height than width, wherein the overlapping shapes on the upper surface of the plate have curved as well as flat form, and wherein the wall elements because of their narrowness are adaptable to conform to curved or flat forms.

References Cited in the file of this patent

UNITED STATES PATENTS

| | | |
|---|---|---|
| 342,493 | Badger | May 25, 1886 |
| 541,205 | Henderson | June 18, 1895 |
| 1,592,211 | Hoffman | July 13, 1926 |
| 1,841,724 | Fraser | Jan. 19, 1932 |
| 2,321,676 | Hennessy | June 15, 1943 |
| 2,569,621 | Toney | Oct. 2, 1951 |
| 2,583,878 | Plym | Jan. 29, 1952 |
| 2,627,801 | Danziger | Feb. 10, 1953 |